United States Patent
Fukuda et al.

(10) Patent No.: US 6,680,762 B2
(45) Date of Patent: Jan. 20, 2004

(54) PROJECTION LIQUID CRYSTAL DISPLAY APPARATUS WHEREIN OVERALL FOCAL POINT OF THE LENS IS SHIFTED TO INCREASE EFFECTIVE APERTURE RATIO

(75) Inventors: Toshihiro Fukuda, Kanagawa (JP); Tomoki Furuya, Kanagawa (JP)

(73) Assignee: Sony Corporation, Tokyo (JP)

(*) Notice: Subject to any disclaimer, the term of this patent is extended or adjusted under 35 U.S.C. 154(b) by 18 days.

(21) Appl. No.: 10/154,713

(22) Filed: May 24, 2002

(65) Prior Publication Data
US 2003/0001986 A1 Jan. 2, 2003

(30) Foreign Application Priority Data
May 28, 2001 (JP) .................................. P2001-158526

(51) Int. Cl.$^7$ ............................................. G02F 1/1335
(52) U.S. Cl. ................... 349/95; 349/5; 349/9; 349/65
(58) Field of Search .................... 349/5–9, 65, 95; 353/30, 32, 34

(56) References Cited

U.S. PATENT DOCUMENTS

| | | | | |
|---|---|---|---|---|
| 5,276,538 A | * | 1/1994 | Monji et al. | 349/95 |
| 5,684,548 A | * | 11/1997 | Ariki et al. | 349/57 |
| 5,764,318 A | * | 6/1998 | Kurematsu et al. | 349/5 |
| 6,219,111 B1 | * | 4/2001 | Fukuda et al. | 349/5 |
| 2002/0113911 A1 | * | 8/2002 | Fukuda | 349/5 |

* cited by examiner

Primary Examiner—Tarifur R. Chowdhury
(74) Attorney, Agent, or Firm—Sonnenschein, Nath & Rosenthal LLP

(57) ABSTRACT

A liquid crystal display device includes a liquid crystal layer, pixel electrodes having pixel apertures, and at least one microlens array including microlenses arranged two-dimensionally in correspondence with the pixel apertures. Each microlens includes a condenser lens having at least one lens surface along an optical axis and condensing light incident thereon toward the corresponding pixel aperture, and a field lens having at least one lens surface along the optical axis and being constructed such that the focal point thereof is at approximately the same position as the principal point of the condenser lens. The overall focal point of the condenser lens and the field lens is shifted from the corresponding pixel aperture, and the amount of shift is set such that an effective aperture ratio is increased compared with the case in which the overall focal point is at the same position as the corresponding pixel aperture.

6 Claims, 14 Drawing Sheets

FIG. 6

| PARAMETER | CONDITION |
|---|---|
| FIRST LENS FOCAL LENGTH | 59.3 μm |
| SECOND LENS FOCAL LENGTH | 41.4 μm |
| DISTANCE BETWEEN LENSES | 41.4 μm |
| OVERALL FOCAL LENGTH | 41.4 μm |
| APERTURE RATIO | 31 % |
| PROJECTION LENS F-NUMBER | 1.7 |
| DOT PITCH | 18 μm × 18 μm |

EFFECTIVE
APERTURE
RATIO: 80%

EFFECTIVE
APERTURE
RATIO: 85%

EFFECTIVE
APERTURE
RATIO: 75%

(n1>ng1,ng2)

(n1<ng1,ng2)

PROJECTION LIQUID CRYSTAL DISPLAY APPARATUS WHEREIN OVERALL FOCAL POINT OF THE LENS IS SHIFTED TO INCREASE EFFECTIVE APERTURE RATIO

RELATED APPLICATION DATA

The present application claims priority to Japanese Application(s) No(s). P2001-158526 filed May 28, 2001, which application(s) is/are incorporated herein by reference to the extent permitted by law.

BACKGROUND OF THE INVENTION

1. Field of the Invention

The present invention relates to a liquid crystal display device and to a projection liquid crystal display apparatus which displays an image by using the liquid crystal display device.

2. Description of the Related Art

Hitherto, projection liquid crystal display apparatuses (liquid crystal projectors) which project light modulated by liquid crystal display devices (hereinafter referred to as liquid crystal panels) on a screen and thereby display an image on the screen are known in the art. There are two types of image-projection methods used in projection liquid crystal display apparatuses: a front projection type (front type) in which an image is projected onto the screen from the front side of a screen, and a rear projection type (rear type) in which an image is projected onto a screen from the rear side of the screen. In addition, there are two types of projection liquid crystal display apparatuses for displaying color images: a single-panel type in which a single liquid crystal panel is used and a three-panel type in which three liquid crystal panels for three colors, that is, red (R), green (G), and blue (B), are used.

FIG. 12 is a schematic diagram showing an optical system (mainly an illuminating optical system) of a projection liquid crystal display apparatus of the known art. In this projection liquid crystal display apparatus, a light source 101, first and second multi-lens array integrators (hereinafter abbreviated as MLAs) 102 and 103 forming a pair, a PS composite element 104, a condenser lens 105, a field lens 106, a liquid crystal panel 107, and a projection lens 108 are arranged along an optical axis 100. The MLAs 102 and 103 include a plurality of small lenses (microlenses) 102M and 103M, respectively, which are arranged two-dimensionally. The PS composite element 104 includes a plurality of half-wave plates 104A at positions corresponding to the positions between adjacent microlenses on the second MLA 103.

In this projection liquid crystal display apparatus, illuminating light emitted from the light source 101 is divided into a plurality of light beams when it passes through the MLAs 102 and 103. The light beams emitted from the MLAs 102 and 103 are incident on the PS composite element 104. Light L10, which is incident on the PS composite element 104 includes a P-polarized light component and a S-polarized light component which intersect each other on a plane perpendicular to the optical axis 100. The PS composite element 104 serves to separate the incident light L10 into the two kinds of polarized light components (a P-polarized light component and an S-polarized light component) L11 and L12. After the polarized light components L11 and L12 are separated from each other, the light component L11 leaves the PS composite element 104 without changing its polarization direction (for example, the P-polarization). Conversely, the polarization direction of the light component L12 (for example, the S-polarization) is changed to the other direction (for example, the P-polarization) by the half-wave plate 104A upon exiting the PS composite element 104. Accordingly, light having a predetermined polarization direction is emitted from the PS composite element 104.

The light emitted from the PS composite element 104 passes through the condenser lens 105 and the field lens 106, and is radiated onto the liquid crystal panel 107. The divided light beams formed by the MLAs 102 and 103 are magnified at a magnification ratio determined on the basis of the focal length fc of the condenser lens 105 and the focal length $f_{ML2}$ of the microlenses 103M formed on the second MLA 103, and are radiated onto the entire incident surface of the liquid crystal panel 107. Accordingly, a plurality of magnified light beams overlap one another on the incident surface of the liquid crystal panel 107, thereby uniformly illuminating the incident surface of the liquid crystal panel 107. The liquid crystal panel 107 spatially modulates the light incident thereon in accordance with an image signal, and emits modulated light. The light emitted from the liquid crystal panel 107 is projected onto a screen (not shown) by the projection lens 108, so that an image is formed on the screen.

In liquid crystal panels, in order to form driving devices such as thin-film transistors (TFTs) on a substrate, a light-shielding area called a black-matrix is formed to separate adjacent pixels. Accordingly, aperture ratios of liquid crystal panels never reach 100%. Therefore, in liquid crystal panels of the known art, in order to increase the effective aperture ratio, one or more microlenses are arranged along an optical axis for each dot (a single pixel or a single sub-pixel), the microlenses being formed on an opposing substrate disposed at the light-incident side and serving as condenser lenses. The "effective aperture ratio" is the ratio of light beams emitted from a liquid crystal panel to light beams incident on the liquid crystal panel. In projection liquid crystal display apparatuses, the effective aperture ratio is generally determined by taking into account not only the light loss caused in the liquid crystal panel but also the shading of light caused by the projection lens.

FIG. 13 is a diagram showing an example of the construction of the liquid crystal panel 107 in which microlenses are formed. In order to make the figure clear, the hatching is partly omitted. The liquid crystal panel 107 includes a pixel electrode substrate 140B and an opposing substrate 140A which is disposed at the light-incident side of the pixel electrode substrate 140B in such a manner that the opposing substrate 140A and the pixel electrode substrate 140B oppose each other with a liquid crystal layer 145 therebetween.

The pixel electrode substrate 140B includes a glass substrate 148, a plurality of pixel electrodes 146, and a plurality of black matrix elements 147. The pixel electrodes 146 and the black matrix elements 147 are arranged two-dimensionally on the glass substrate 148 at the light-incident side thereof. The pixel electrodes 146 are conductive, transparent members, and the black matrix elements 147 are formed between adjacent pixel electrodes 146. The black matrix elements 147 are shielded from light by, for example, a metal layer, and switching elements (not shown) used for selectively applying a voltage to the adjacent pixel electrodes 146 in accordance with an image signal are formed inside the black matrix elements 147. TFTs, for example, are used as the switching elements for applying a voltage to the pixel electrodes 146.

The opposing substrate 140A includes a glass substrate 141, a microlens array 142, and a cover glass 144 in that order from the light-incident side. A resin layer 143 is laminated between the glass substrate 141 and the microlens array 142. In addition, although not shown in the figure, opposing electrodes for generating a voltage between the pixel electrodes 146 and the opposing electrodes are arranged between the cover glass 144 and the liquid crystal layer 145. The resin layer 143 is formed of an optical plastic whose refractive index is n1.

The microlens array 142 is formed of an optical plastic whose refractive index is n2(>n1), and includes a plurality of microlenses 142M arranged two-dimensionally in correspondence with the pixel electrodes 146. The microlenses 142M are convex toward the light-incident side thereof and have positive refractive power. Each microlens 142M serves to condense light incident thereon through the glass substrate 141 and the resin layer 143 on the corresponding pixel electrode unit 146. When the projection lens 108 has a sufficient F-number, the light which is condensed by the microlenses 142M and passes though apertures 146A is utilized for displaying an image. When the microlenses 142M are provided, the amount of light that passes through the apertures 146A of the pixel electrodes 146 can be increased compared with a case in which the microlenses 142M are not provided. Accordingly, the effective aperture ratio can be increased and the light-utilizing efficiency can be improved.

In the liquid crystal panel 107 having the above-described construction, when a light component 211 whose divergence angle relative to an optical axis 200 is $\beta$ is incident on one of the microlenses 142M, it is refracted by the power of the microlens 142M and is emitted in such a state that the divergence angle is increased compared with a case in which the microlenses 142M are not provided. The divergence angle of the emitted light (emission divergence angle), $\theta$, is the sum of the angle $\alpha$ generated by the power of the microlenses 142M and the initial angle $\beta$. Accordingly, the following equation is given:

$$\theta = \alpha + \beta \quad (1)$$

When $f_{ML}$ is the focal length of the microlens 142M and is the external size (diameter) of the microlens 142M, the angle $\alpha$ generated by the power of the microlens 142M is defined as follows:

$$\tan \alpha = a/f_{ML} \quad (2)$$

When fc and rc are the focal length and the radius, respectively, of the condenser lens 105 (see FIG. 12), the divergence angle of the illuminating light incident on the liquid crystal panel 107 (incident divergence angle), $\beta$, is defined as follows:

$$\tan \beta = rc/fc \quad (3)$$

In addition, when the divergence angle of the light emitted from the liquid crystal panel 107 is $\theta$, the projection lens 108 must have an F-number (Fno) defined as follows:

$$Fno = 1/(2 \sin \theta) \quad (4)$$

In the above-described liquid crystal panel 107, when light having a large divergence angle $\beta$ is incident thereon, the microlenses 142M cannot sufficiently focus the light into the apertures 146A, so that the light is partly blocked by the black matrix elements 147. In addition, when the incident divergence angle $\beta$ is large, the degree of divergence of the emitted light is increased by the power of the microlenses 142M compared with the case in which the microlenses 142M are not provided, and the emission divergence angle $\theta$ is increased, as is clear from Equation (1). On the other hand, the projection lens 108 cannot receive light which is incident at an angle exceeding the angle determined by the F-number defined by Equation (4). Accordingly, shading occurs at the projection lens 108 when the emission divergence angle $\theta$ is too large.

Accordingly, in order to improve the light-utilizing efficiency by using the microlenses 142M, the incident divergence angle $\beta$ must be reduced. However, as is understood from Equation (3), in order to reduce the incident divergence angle $\beta$, the focal length fc of the condenser lens 105 must be increased. In addition, the focal length of the microlenses 103M of the second MLA 103 must also be increased. Accordingly, when the incident divergence angle $\beta$ is reduced, the optical path length from the light source 101 to the liquid crystal panel 107 is increased. When the optical path length is increased, the overall size of the apparatus is also increased and the light-utilizing efficiency in the overall illuminating optical system, that is, the system including the illuminating optical system positioned before the liquid crystal panel 107, is reduced. When a lens having an F-number corresponding to high brightness which is sufficient for the emission divergence angle $\theta$ (for example, F-number=1.2 to 1.5) is used as the projection lens 108, shading at the projection lens 108 can be eliminated. However, there is a problem in that lenses having F-numbers corresponding to high brightness are difficult to design and thus high costs are incurred.

The problems of the above-described illuminating system and the microlenses 142M formed in the liquid crystal panel 107 can be summarized as follows:

(i) Light having a large incident divergence angle $\beta$ causes shading at the black matrix elements in the liquid crystal panel or at the projection lens.

(ii) Although the effective aperture ratio of the liquid crystal panel can be increased by reducing the incident divergence angle $\beta$, the light-utilizing efficiency of the overall illuminating system is reduced and the size of the apparatus is increased in such a case.

(iii) The divergence angle $\theta$ of the light emitted from the liquid crystal panel is determined as the sum of the angle $\alpha$ generated by the power of the microlenses and the incident divergence angle $\beta$, and is larger than that in the case in which the microlenses are not provided. Accordingly, a lens having an F-number corresponding to high brightness which is sufficient for the emission divergence angle $\theta$ must be used as the projection lens. Such a projection lens is difficult to design and thus high costs are incurred.

The shading at the black matrix elements 147 described in (i) can be reduced by reducing the focal length of the microlenses 142M in the liquid crystal panel 107. However, in such a case, the angle $\alpha$ generated by the power of the microlenses 142M is increased, so that the emission divergence angle $\theta$ is also increased. Accordingly, the problems described in (iii) occur. When the F-number of the projection lens 108 is reduced in order to increase the brightness, problems occur in that imaging performance is degraded and the size of the projection lens itself and the manufacturing costs are increased. In actual projection liquid crystal display apparatuses, the focal length $f_{ML}$ of the microlenses 142M is increased and the distance between the pixel apertures and the microlenses is optimized in accordance with the F-number of the projection lens 108. Accordingly, the problems described in (i) and (ii) are not solved.

On the other hand, a liquid crystal panel shown in FIG. 14 has been suggested in which another microlens array 152 is disposed on the pixel electrode substrate 140B, and the angle a generated by the power of the microlenses 142M formed in the opposing substrate 140A is canceled when the light is emitted from the microlens array 152. In the example shown in FIG. 14, the microlens array 142 in the opposing substrate 140A is formed directly on the glass substrate 141 at the light-emission side thereof. In addition, another microlens array 152 formed of an optical resin is disposed on the pixel electrode substrate 140B at the light-emission side thereof. In addition, a glass substrate 151 is disposed on the microlens array 152 at the light-emission side thereof. The microlens array 152 includes a plurality of microlenses 152M which correspond to the microlenses 142M formed in the opposing substrate 140A. The microlenses 152M are convex at the light-emission side thereof and have positive refractive power. Each microlens 152M is constructed such that it serves as a collimator by being combined with the corresponding microlens 142M. When n1 and n2 are the refractive indexes of the glass substrate 141 and the microlenses 142M, respectively, and n3 and n4 are the refractive indexes of the microlenses 152M and the glass substrate 151, respectively, the liquid crystal panel is constructed such that n2>n1 and n3>n4 are satisfied.

When a light component 212, for example, is incident on the liquid crystal panel as shown in FIG. 14, it is refracted by an angle a by the power of the microlens 142M formed in the opposing substrate 140A. Then, the light component is refracted by the angle $-\alpha$ in the opposite direction by the corresponding microlens 152M formed on the pixel electrode substrate 140B due to the function thereof as a collimator. Accordingly, the angle a generated by the power of the microlens 142M formed in the opposing substrate 140A is canceled when it is emitted from the microlens 152M. Since the angle $\alpha$ is canceled, the emission divergence angle $\theta$ is given by $\theta=\beta$ from Equation (1), and is reduced by the angle $\alpha$ compared with the example shown in FIG. 13. However, when the microlenses are arranged as described above, if, for example, a light component 213, whose incident divergence angle is $\beta$ and which must be incident on a microlens 152M-1, is incident on the adjacent microlens 152M-2, the microlens 152M-2 cannot serve as a collimator for this incident light component. In such a case, the above-described relationship ($\theta=\beta$) cannot be obtained and the emission divergence angle $\theta$ becomes larger than the incident divergence angle $\beta$, so that the effective aperture ratio cannot be increased.

In addition, Japanese Unexamined Patent Application Publication No. 5-341283 discloses a liquid crystal panel in which the incident divergence angle $\beta$ is canceled. The liquid crystal panel disclosed in this publication includes a pair of glass substrates and a liquid crystal layer disposed between the glass substrates, and microlenses are arranged on both sides of at least one of the glass substrates in correspondence with pixel apertures. In this liquid crystal panel, the focal length of the microlenses formed at one side of the glass substrate is made the same as the focal length of the microlenses formed at the other side of the glass substrate. In addition, the distance between the microlenses formed at one side of the glass substrate and the microlenses formed at the other side of the glass substrate is made the same as the focal length. When collimated light is incident, the microlenses at either side of the glass substrate serve to converge the light on the surface at the other side. Thus, the incident divergence angle $\beta$ is canceled before the light is emitted. According to this publication, the microlenses are formed by the ion-exchange method.

In the above-described publication, the microlenses at either side of the substrate are convex toward the inside and the surfaces facing outward (surfaces at both sides of the substrate) are flat. In addition, the distance between the microlenses formed at the side closer to the pixel apertures and the pixel apertures is approximately 0. In this case, the thickness of the substrate including the microlenses is about several tens of micrometers. However, in the above-described construction, there is a problem in that the substrate including the microlenses is extremely difficult to manufacture. Especially when the ion-exchange method is applied, it is difficult to control the thickness, and it is also difficult to process a thin substrate whose thickness is several tens of micrometers at a high precision so as to obtain the desired optical characteristics. For example, although the lens surfaces of the microlenses formed at both sides of the substrate must be polished in order to obtain the desired optical characteristics, it is extremely difficult to polish a thin substrate whose thickness is several tens of micrometers. In recent years, high-precision liquid crystal panels with small pixel pitches have been required, so that high processing precision is necessary. Accordingly, the liquid crystal panel according to the above-described publication has a disadvantage in this point.

SUMMARY OF THE INVENTION

In consideration of the above-described problems, an object of the present invention is to provide a liquid crystal display device and a projection liquid crystal display apparatus in which the effective aperture ratio can be increased and the light-utilizing efficiency can be improved without increasing the size or complicating the manufacturing process. In addition, another object of the present invention is to provide a liquid crystal display device and a projection liquid crystal display apparatus in which the light-collection efficiency is optimized by adjusting the positional relationship between the microlenses and the pixel apertures along the optical axis.

In order to attain the above-described objects of the present invention, a liquid-crystal display according to the present invention includes a liquid crystal layer; a plurality of pixel electrodes, having pixel apertures which allow light to pass therethrough; and at least one microlens array disposed at at least one of a light-incident side and a light-emission side of the liquid crystal layer, the microlens array having a plurality of microlenses arranged two-dimensionally in correspondence with the pixel apertures. Each microlens includes a condenser lens and a field lens, the condenser lens having at least one lens surface along an optical axis and condensing light incident thereon toward the corresponding pixel aperture, and the field lens having at least one lens surface along the optical axis and being constructed such that the focal point of the field lens is at approximately the same position as the principal point of the condenser lens. In addition, the overall focal point of the condenser lens and the field lens is shifted from the corresponding pixel aperture and the amount of shift is set such that an effective aperture ratio is increased compared with the case in which the overall focal point is at the same position as the corresponding pixel aperture. Preferably, the amount of shift exceeds ±10% of the overall focal length. In addition, preferably, when light having a divergence angle component is incident, the divergence angle component is eliminated by the optical behavior of the field lens when the light is emitted from the microlens array, so that the emission angle of the incident light is the same as an emission angle of a principal ray which is incident parallel to the optical axis. The liquid crystal display device may be used in a projection liquid crystal display apparatus in which light that has passed through the liquid crystal display device is projected by a projection lens. In such a case, a numerical aperture of each microlens is set such that the numerical aperture approximately corresponds to an F-number of the projection lens.

In addition, according to the present invention, a projection liquid crystal display apparatus includes a light source which emits light; a liquid crystal display device which serves to modulate incident light; and a projection lens which projects light modulated by the liquid crystal display device. The liquid crystal display device includes a liquid crystal layer, a plurality of pixel electrodes, having pixel apertures which allow light to pass therethrough, and at least one microlens array disposed at at least one of a light-incident side and a light-emission side of the liquid crystal layer, the microlens array having a plurality of microlenses arranged two-dimensionally in correspondence with the pixel apertures. Each microlens includes a condenser lens and a field lens, the condenser lens having at least one lens surface along an optical axis and condensing light incident thereon toward the corresponding pixel aperture, and the field lens having at least one lens surface along the optical axis and being constructed such that the focal point of the field lens is at approximately the same position as the principal point of the condenser lens. In addition, the overall focal point of the condenser lens and the field lens is shifted from the corresponding pixel aperture and the amount of shift is set such that an effective aperture ratio is increased compared with the case in which the overall focal point is at the same position as the corresponding pixel aperture.

In the liquid crystal display device and the projection liquid crystal display apparatus according to the present invention, each microlens is constructed of a condenser lens and a field lens. The condenser lens serves to condense light emitted from the light source and incident on the condenser lens toward the corresponding pixel aperture, and the field lens is constructed such that the focal point thereof is at approximately the same position as the principal point of the condenser lens. In such a construction, when light having a divergence angle component relative to an optical axis is incident on the microlens, the divergence angle component is eliminated when the light is emitted therefrom. Accordingly, even when the focal length of the microlens is reduced, the divergence angle of the emitted light can be prevented from being increased. When the liquid crystal display device is used in a projection liquid crystal display, shading of light due to projection lens can be reduced. In addition, according to the present invention, the pixel aperture is shifted from the overall focal point of the condenser lens and the field lens, and the amount of shift is set such that the effective aperture ratio is increased compared with the case in which the overall focal point is at the same position as the corresponding pixel aperture. When all of the angular components of the incident light are analyzed, the effective aperture ratio is not always optimum when the overall focal point is at exactly the same position as the pixel aperture. When all of the angular components are taken into account, the effective aperture ratio is increased when the overall focal point of the microlens is shifted away from the pixel aperture. Accordingly, the positional relationship between the overall focal point and the pixel aperture is preferably optimized so that the effective aperture ratio can be increased. The effective aperture ratio shows the ratio of the light beams passing through the microlens, the pixel aperture, and the projection lens to the light beams emitted from the light source and incident on the pixel.

Thus, according to the liquid crystal display device and the projection liquid crystal display apparatus of the present invention, the effective aperture ratio can be increased and the light-utilizing efficiency can be improved without increasing the size or complicating the manufacturing process. Thus, the light-utilizing efficiency can be improved and the optical output can be increased, and the size of the projection liquid crystal display apparatus and the cost of the projection lens can be reduced. Furthermore, an allowable displacement between the substrate in which the pixel apertures are formed and the substrate in which the microlenses are formed can be increased.

BRIEF DESCRIPTION OF THE DRAWINGS

FIG. 6 is a table showing the optical parameters of the microlens array;

DESCRIPTION OF THE PREFERRED EMBODIMENT

Figure 1:
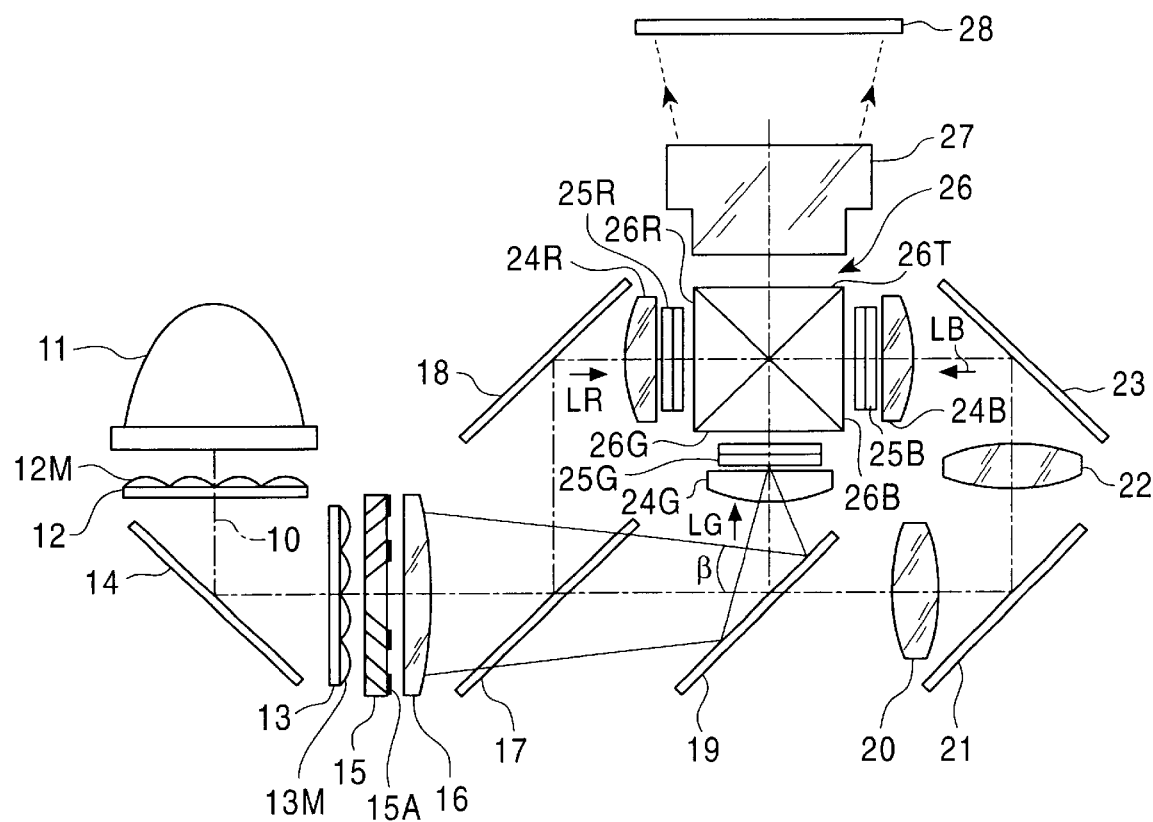
FIG. 1 is a schematic diagram showing the overall construction of an optical system of a projection liquid crystal display apparatus according to an embodiment of the present invention.

FIG. 1 is a diagram showing the overall construction of a projection liquid crystal display apparatus according to an embodiment of the present invention. The projection liquid crystal display apparatus shown in FIG. 1 is of the three-panel type in which three transmissive liquid crystal panels are used for displaying a color image. This projection liquid crystal display apparatus includes a light source 11 which emits light, first and second multi-lens array integrators 12 and 13 (hereinafter abbreviated as MLAs) forming a pair, and a reflecting mirror 14 which is disposed between the MLAs 12 and 13 in such a manner that the direction of a light path (an optical axis 10) is changed by 90 degrees toward the second MLA 13. The MLAs 12 and 13 are provided with a plurality of microlenses 12M and 13M, respectively, which are arranged two-dimensionally. The MLAs 12 and 13 serve to divide the incident light into a plurality of light beams, and thereby make the luminance distribution uniform.

The light source 11 emits white light including red, blue, and green light components, which are necessary for displaying a color image. The light source 11 includes an illuminant (not shown) which emits white light and a concave mirror which reflects and condenses the light emitted by the illuminant. The illuminant may be, for example, a halogen lamp, a metal halide lamp, a xenon lamp, etc. The concave mirror preferably has a shape such that a high light-collection efficiency is obtained, and a mirror having a rotationally symmetric surface, such as a spheroid mirror or a paraboloid mirror, is used as the concave mirror.

The projection liquid crystal display apparatus also includes a PS composite element 15, a condenser lens 16, and a dichroic mirror 17 in that order from the light-emission side of the second MLA 13. The dichroic mirror 17 serves to separate the incident light into, for example, a red light component LR and light components corresponding to the other colors.

Figure 5:
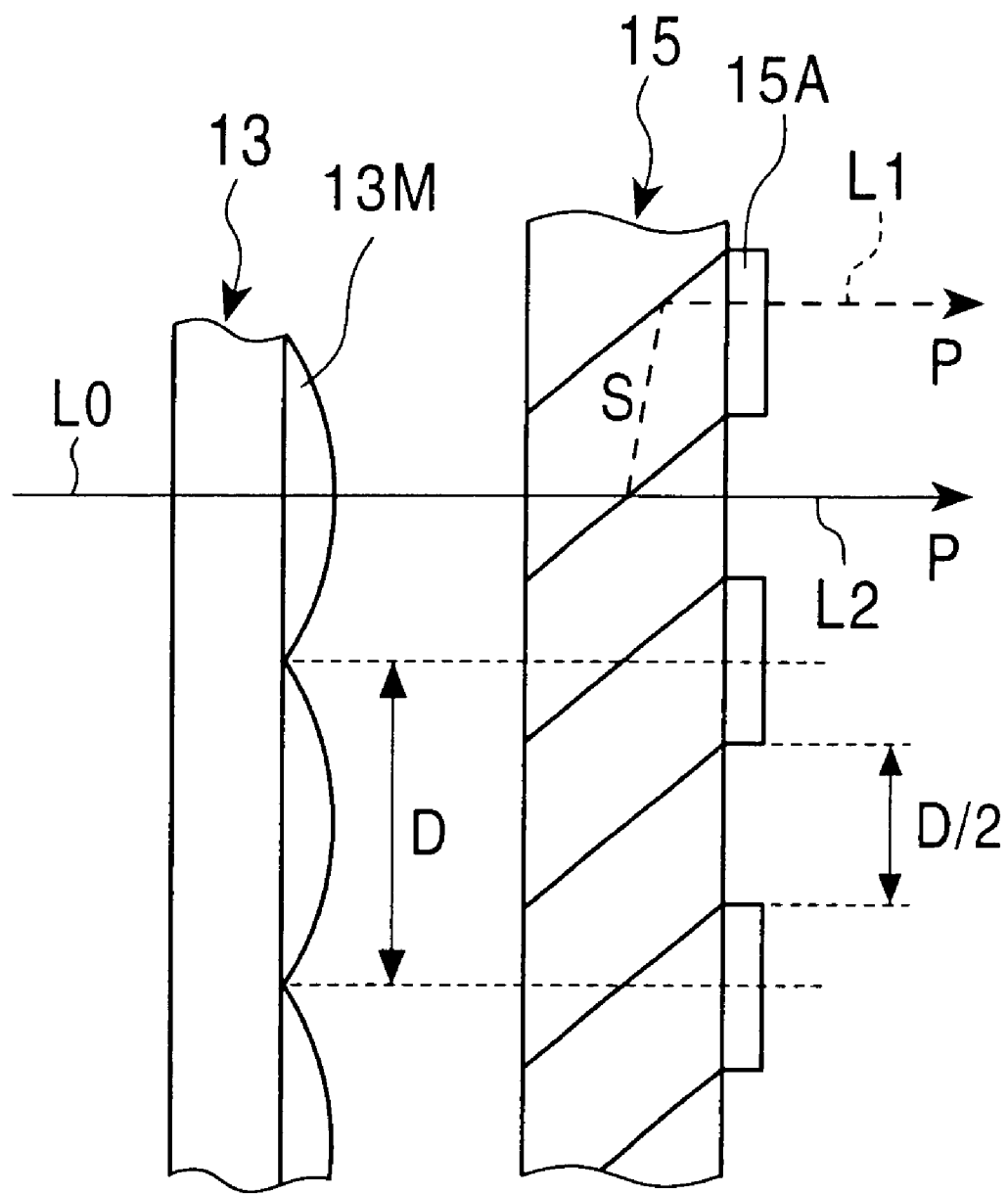
FIG. 5 is an enlarged view of a part of a second microlens array and a PS composite element.

The PS composite element 15 includes a plurality of half-wave plates 15A at positions corresponding to the positions between adjacent microlenses of the second MLA 13. In addition, as shown in FIG. 5, the PS composite element 15 serves to separate the incident light L0 into two kinds of polarized light components (a P-polarized light component and a S-polarized light component) L1 and L2. After the polarized light components L1 and L2 are separated from each other, the light component L2 leaves the PS composite element 15 without changing its polarization direction (for example, the P-polarization). Conversely, the polarization direction of the light component L1 (for example, the S-polarization) is changed to the other direction (for example, the P-polarization) by the half-wave plate 15A upon exiting the PS composite element 15.

The projection liquid crystal display apparatus also includes a reflecting mirror 18, a field lens 24R, and a liquid crystal panel 25R in that order along the light path of the red light component LR, which is split off by the dichroic mirror 17. The reflecting mirror 18 reflects the red light component LR toward the liquid crystal panel 25R. The liquid crystal panel 25R spatially modulates the red light component LR, which is incident thereon through the field lens 24R, in accordance with an image signal.

The projection liquid crystal display apparatus also includes a dichroic mirror 19 disposed in the path of the light components corresponding to colors other than red. The dichroic mirror 19 separates the light incident thereon into, for example, a green light component LG and a blue light component LB.

The projection liquid crystal display apparatus also includes a field lens 24G and a liquid crystal panel 25G in that order along the light path of the green light component LG, which is split off by the dichroic mirror 19. The liquid crystal panel 25G spatially modulates the green light component LG, which is incident thereon through the field lens 24G, in accordance with the image signal.

In addition, the projection liquid crystal display apparatus also includes a relay lens 20, a reflecting mirror 21, a relay lens 22, a reflecting mirror 23, a field lens 24B, and a liquid crystal panel 25B in that order along the light path of the blue light component LB, which is split off by the dichroic mirror 19. The reflecting mirror 21 reflects the blue light component LB, which is incident thereon through the relay lens 20, toward the reflecting mirror 23. The reflecting mirror 23 reflects the blue light component LB, which is reflected by the reflecting mirror 21 and is incident on the reflecting mirror 23 through the relay lens 22, toward the liquid crystal panel 25B. The liquid crystal panel 25B spatially modulates the blue light component LB, which is reflected by the reflecting mirror 23 and is incident on the liquid crystal panel 25B through the field lens 24B, in accordance with the image signal.

The projection liquid crystal display apparatus also includes a cross prism 26, which is placed at a position where the red light component LR, the green light component LG, and the blue light component LB intersect and which serves to combine the three light components LR, LG, and LB. In addition, the projection liquid crystal display apparatus also includes a projection lens 27 which projects the combined light emitted from the cross prism 26 onto a screen 28. The cross prism 26 has three incident surfaces 26R, 26G, and 26B, and one emission surface 26T. The red light component LR emitted from the liquid crystal panel 25R is incident on the incident surface 26R, the green light component LG emitted from the liquid crystal panel 25G is incident on the incident surface 26G, and the blue light component LB emitted from the liquid crystal panel 25B is incident on the incident surface 26B. The cross prism 26 combines the three light components incident on the incident surfaces 26R, 26G, and 26B and emits the combined light from the emission surface 26T.

Figure 2:
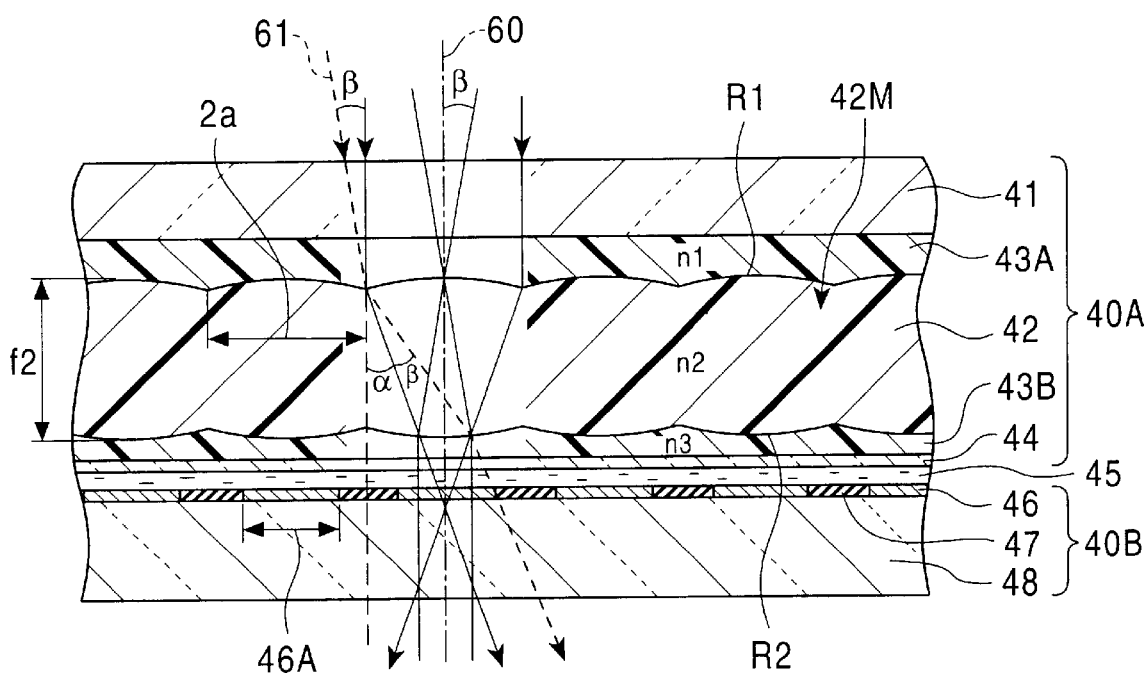
FIG. 2 is a schematic sectional view showing the construction of a liquid crystal panel according to the embodiment of the present invention.

FIG. 2 is a diagram showing an example of the construction of the liquid crystal panels 25R, 25G, and 25B. Although the liquid crystal panels 25R, 25G, and 25B modify light components corresponding to different colors, the function and construction thereof are substantially the same. In the following descriptions, the construction of the liquid crystal panels 25R, 25G, and 25B will be described. In FIG. 2, in order to make the figure clear, the hatching is partly omitted. The liquid crystal panel 25 (25R, 25G, and 25B) includes a pixel electrode substrate 40B and an opposing substrate 40A which is disposed at the light-incident side of the pixel electrode substrate 40B in such a manner that the opposing substrate 40A and the pixel electrode substrate 40B oppose each other with a liquid crystal layer 45 therebetween.

The pixel electrode substrate 40B includes a glass substrate 48, a plurality of pixel electrodes 46, and a plurality of black matrix elements 47. The pixel electrodes 46 and the black matrix elements 47 are laminated on the glass substrate 48 at the light-incident side thereof. The pixel electrode substrate 40B also includes an alignment film (not shown) laminated between the liquid crystal layer 45 and the layer including the pixel electrodes 46 and the black matrix elements 47. The pixel electrodes 46 and the black matrix elements 47 are arranged two-dimensionally. The pixel electrodes 46 are conductive, transparent members, and the black matrix elements 47 are formed between adjacent pixel electrodes 46. The black matrix elements 47 are shielded from light by, for example, a metal layer, and switching elements (not shown) used for selectively applying a voltage to the adjacent pixel electrodes 46 in accordance with an image signal are formed inside the black matrix elements 47. TFTs, for example, are used as the switching elements for applying a voltage to the pixel electrodes 46. The pixel electrodes 46 surrounded by the black matrix elements 47 have apertures through which the incident light is able to pass, each aperture serving as a pixel aperture 46A corresponding to a single pixel.

The opposing substrate 40A includes a glass substrate 41, a first resin layer 43A, a microlens array 42, a second resin layer 43B, and a cover glass 44 in that order from the light-incident side. Although not shown in the figure, the opposing substrate 40A also includes opposing electrodes and an alignment film disposed between the cover glass 44 and the liquid crystal layer 45. The opposing electrodes are used for generating a voltage between pixel electrodes 46 and the opposing electrodes.

The microlens array 42 is formed of an optical plastic and includes a plurality of microlenses 42M arranged two-dimensionally in correspondence with the pixel electrodes 46. The microlenses 42M have positive refractive power, and each microlens 42M serves to condense light incident on the liquid crystal panel 25 on the corresponding pixel electrode unit 46. When the projection lens 27 has a sufficient F-number, most of the light which is incident on the liquid crystal panel 25, condensed by the microlenses 42M, and passes though apertures 46A is utilized for displaying an image. In order to effectively utilize the light emitted from the liquid crystal panel 25, the F-number of the projection lens 27 is preferably set to a value corresponding to the same or a higher brightness compared with the brightness determined by the numerical aperture of the microlenses 42M.

Each microlens 42M includes two lens surfaces R1 and R2 which are arranged along the optical axis for a single pixel aperture 46A, that is, a single dot (a single pixel or a single sub-pixel). Both lens surfaces R1 and R2 have positive refractive power. In the example shown in FIG. 2, both lens surfaces R1 and R2 have a spherical shape, and the first lens surface R1 is convex toward the light-incident side (toward the light source) and the second lens surface R2 is convex toward the light-emission side. In order for the lens surfaces R1 and R2 to have positive refractive power, when n1, n2, and n3 are the refractive indexes of the first resin layer 43A, the microlens array 42, and the second resin layer 43B, respectively, n2>n1 and n2>n3 are satisfied. The difference between the refractive indexes n2 and n1 is, for example, about 0.2 to 0.3, and preferably higher. Similarly, the difference between the refractive indexes n2 and n3 is about 0.2 to 0.3, and preferably higher.

Figure 4:
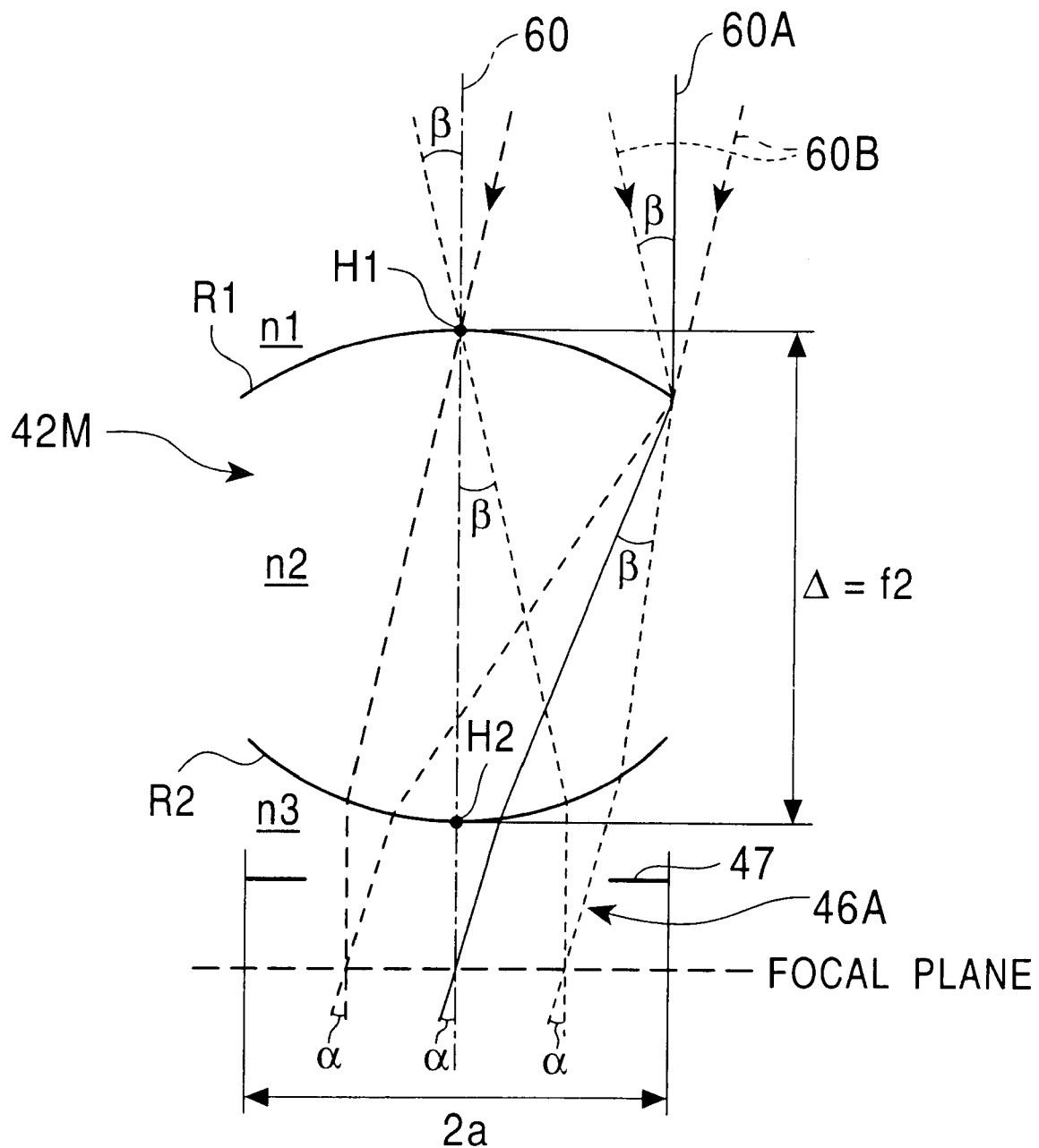
FIG. 4 is a schematic sectional view showing the construction of a microlens formed in the liquid crystal panel shown in FIG. 2.

In each microlens 42M, the focal point of the second lens surface R2 is at approximately the same position as the principal point H1 of the first lens surface R1 (see FIG. 4). In addition, the overall focal point of the microlens 42M is shifted from the position of the corresponding pixel aperture 46A. The amount of shift is set such that the effective aperture ratio is increased compared with the case in which the overall focal point of the microlens 42M is at the same position as the corresponding pixel aperture 46A. The first lens surface R1 serves as a condenser lens having a light-condensing function, and the second lens surface R2 serves as a field lens. The overall focal point of the microlens is defined as the point of overall focus of the condenser lens and the field lens.

In general, it is considered that the effective aperture ratio is improved as the overall focal point of the microlens is made closer to the pixel aperture. However, when all of the angular components of the incident light are taken into account, the effective aperture ratio is not always optimum when the overall focal point is at exactly the same position as the pixel aperture. When all of the angular components are taken into account, the effective aperture ratio is increased when the overall focal point of the microlens is shifted away from the pixel aperture along the optical axis. Accordingly, in the present invention, the positional relationship between the overall focal point of the microlens and the pixel aperture along the optical axis is optimized, so that the collection efficiency of the pixel aperture can be improved.

The shapes of the first resin layer 43A, the microlens array 42, and the second resin layer 43B are not limited to the shapes shown in the figure as long as the lens surfaces R1 and R2 have positive refractive power and exhibit the desired optical characteristics. In addition, as long as the lens surfaces R1 and R2 have sufficient power to function as the microlens 42M, the resin layers 43A and 43B can be omitted and the microlens array 42 can be directly disposed between the glass substrate 41 and the cover glass 44, as will be described below.

Next, a method for manufacturing the microlens array in the liquid crystal panel 25 will be described below. First, the first resin layer 43A and the second resin layer 43B are manufactured. The first resin layer 43A is manufactured by forming, for example, an acrylic resin with a stamper having the pattern of the first lens surfaces R1 of the microlenses 42M. The second resin layer 43B is similarly manufactured by forming, for example, an acrylic resin with a stamper having the pattern of the second lens surfaces R2 of the microlenses 42M. The thus formed resin layers 43A and 43B are disposed such that they oppose each other, and an optical resin (for example, urethane resin, acrylic resin, etc.) for forming the microlens array 42 is injected between the resin layers 43A and 43B. The optical resin serves as an adhesive, so that the first resin layer 43A, the microlens array 42, and the second resin layer 43B are combined together. Then, the outside surfaces of the first resin layer 43A and the second resin layer 43B are polished. The method for manufacturing the microlens array 42 is not limited to the above-described method, and other methods may also be used.

In the liquid crystal panel 25, layers such as the cover glass 44, the alignment film (not shown), and the liquid crystal panel 45 placed between the second lens surfaces R2 and the pixel apertures 46A are preferably made as thin as possible (for example, the overall thickness is preferably made 5 to 25 μm in air).

Figure 3:
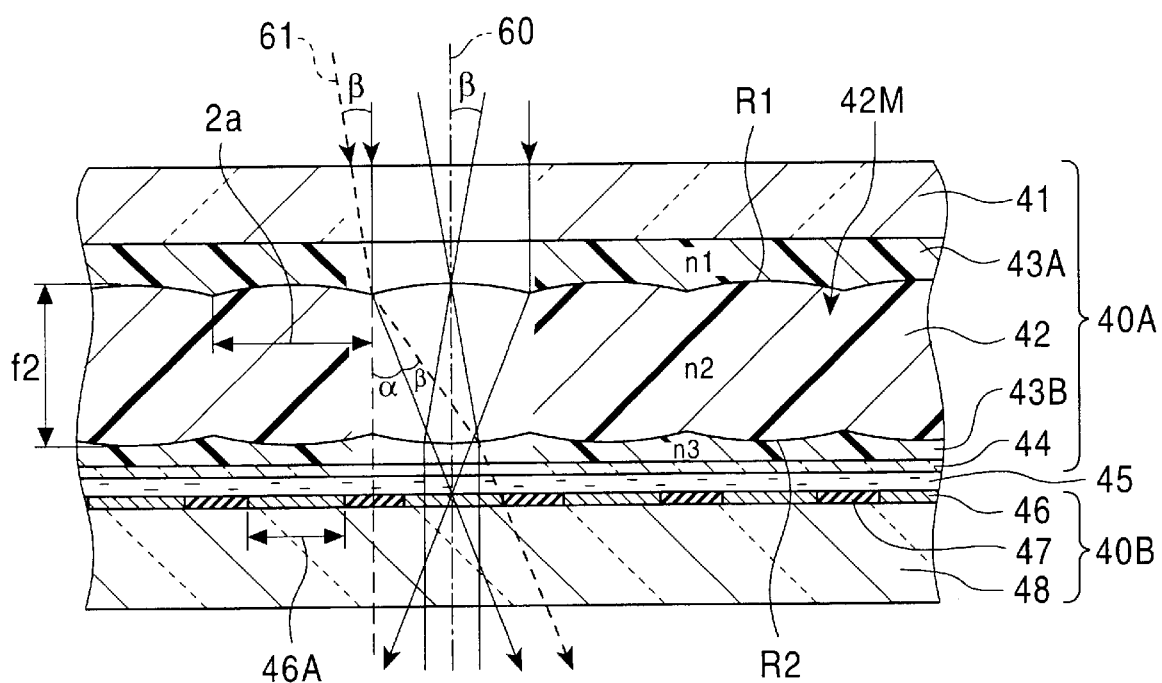
FIG. 3 is a schematic sectional view showing the construction of a comparative example of a liquid crystal panel.

FIG. 3 is a diagram showing a comparative example of a liquid crystal panel. The basic construction of the liquid crystal panel shown in FIG. 3 is the same as the one shown in FIG. 2, and similar components are denoted by the same reference numerals in order to facilitate understanding. The liquid crystal panel shown in FIG. 3 differs from the one shown in FIG. 2 in that the overall focal point of each microlens 42M is at the same position as the corresponding pixel aperture 46A. In this case, a spot image at the pixel aperture and a diaphragm of the illuminating light are conjugate to each other, and the intensity distribution at the diaphragm is directly projected onto the pixel aperture. However, since the light emitted from the lamp is not always uniform, the intensity thereof differs in accordance with the angle at which the light is incident on the panel. Accordingly, the spot image at the focal position does not always correspond to the maximum transmission efficiency at the aperture.

Next, the operation of the projection liquid crystal display apparatus having the above-described construction will be described. First, the overall operation of the projection liquid crystal display apparatus will be explained with reference to FIG. 1. The white light emitted from the light source 11 is divided into a plurality of light beams when it passes through the MLAs 12 and 13. The light beams emitted from the MLAs 12 and 13 are incident on the PS composite element 15. Light incident on the PS composite element 15 includes a P-polarized light component and a S-polarized light component which intersect each other on a plane perpendicular to the optical axis 10. As shown in FIG. 5, the PS composite element 15 serves to separate the incident light L0, into the two kinds of polarized light components (a P-polarized light component and a S-polarized light component) L1 and L2. After the polarized light components L1 and L2 are separated from each other, the light component L2 leaves the PS composite element 15 without changing its polarization direction (for example, the P-polarization). Conversely, the polarization direction of the light component L1 (for example, the S-polarization) is changed to the other direction (for example, the P-polarization) by the half-wave plate 15A upon exiting the PS composite element 15. Accordingly, light having a predetermined polarization direction (for example, the P-polarization) is emitted from the PS composite element 15.

The light emitted from the PS composite element 15 passes through the condenser lens 16 and is incident on the dichroic mirror 17. The light incident on the dichroic mirror 17 is divided into, for example, the red light component LR and light components corresponding to other colors.

The red light component LR split off by the dichroic mirror 17 is reflected by the reflecting mirror 18 toward the liquid crystal panel 25R. The red light component LR reflected by the reflecting mirror 18 passes through the field lens 24R and is incident on the liquid crystal panel 25R. Then, the red light component LR incident on the liquid crystal panel 25R is spatially modulated by the liquid crystal panel 25R in accordance with the image signal, and is incident on the incident surface 26R of the cross prism 26.

The light components corresponding to colors other than red, which are split off by the dichroic mirror 17, are incident on the dichroic mirror 19, and are divided into, for example, the green light component LG and the blue light component LB. The green light component LG split off by the dichroic mirror 19 passes through the field lens 24G and is incident on the liquid crystal panel 25G. Then, the green light component LG incident on the liquid crystal panel 25G is spatially modulated by the liquid crystal panel 25G in accordance with the image signal, and is incident on the incident surface 26G of the cross prism 26.

The blue light component LB split off by the dichroic mirror 19 passes through the relay lens 20, is incident on the reflecting mirror 21, and is reflected by the reflecting mirror 21 toward the reflecting mirror 23. The blue light component LB reflected by the reflecting mirror 21 passes through the relay lens 22, is incident on the reflecting mirror 23, is reflected by the reflecting mirror 23 toward the liquid crystal panel 25B, and is incident on the liquid crystal panel 25B. Then, the blue light component LB incident on the liquid crystal panel 25B is spatially modulated by the liquid crystal panel 25B in accordance with the image signal, and is incident on the incident surface 26B of the cross prism 26.

The divided light beams formed by the MLAs 12 and 13 are enlarged and overlap one another on the incident surfaces of the liquid crystal panels 25R, 25G, and 25B, thereby uniformly illuminating the liquid crystal panels 25R, 25G, and 25B. The divided light beams formed by the MLAs 12 and 13 are enlarged at a magnification ratio determined on the basis of and the focal length fc of the condenser lens 16 and the focal length $f_{MLA2}$ of the microlenses 13M formed on the second MLA 13.

The three light components LR, LG, and LB incident on the cross prism 26 are combined by the cross prism 26, and the combined light is emitted toward the projection lens 27 through the emission surface 26T. The emitted light is projected onto the front surface or the rear surface of the screen 28 so that an image is formed on the screen 28.

Next, the optical operation and effects of the microlenses 42M, which characterize the present embodiment, will be described below mainly with reference to FIG. 4. In order to make the figure simple, only main components of the microlenses formed in the liquid crystal panel 25 are shown in FIG. 4. As explained above, the first lens surface R1 and the second lens surface R2 of the microlens 42M have positive refractive power. In addition, the focal point of the second lens surface R2 is at approximately the same position as the principal point H1 of the first lens surface R1, and the overall focal point of the microlens 42M is shifted from the position of the pixel aperture 46A. In the following descriptions, it is assumed that illuminating light which is emitted from the illuminating optical system positioned before the liquid crystal panel 25 and whose divergence angle is β is incident on the liquid crystal panel 25 over the entire area thereof.

First, a principal ray 60A (shown by the solid line in the figure), which is parallel to an optical axis 60 of the microlens 42M, is considered. The principal ray 60A is converged into the pixel aperture 46A by the overall power of the microlens 42M. The maximum divergence angle a of light emitted from the microlens 42M relative to the optical axis 60, is determined on the basis of the relationship between the maximum external size of the microlens 42M and the overall focal length of the microlens 42M. More specifically, when is the external size (diameter) of the microlens 42M and the overall focal length is f, the following equation is satisfied:

$$\tan\alpha = a/f \quad (5)$$

When f1 is the focal length of the first lens surface R1 and f2 is the focal length of the second lens surface R2, the overall focal length is determined as follows:

$$f = f1 \times f2/(f1 + f2 - \Delta) \quad (6)$$

where Δ is the distance between the principal point H1 of the first lens surface R1 and the principal point H2 of the second lens surface R2.

When the focal point of the second lens surface R2 is at the same position as the principal point H1 of the first lens surface R1, Δ=f2 is satisfied. Accordingly, the overall focal length f is determined as follows:

$$f = f2 \quad (7)$$

Equation (7) shows that the overall focal length f is always f2 irrespective of the focal length f1 of the first lens surface R1. From Equations (5) and (7), it is understood that the maximum emission divergence angle a of the principal ray 60A is determined only by the external size (radius) a of the microlens 42M and the focal length f2 of the second lens surface R2. In addition, in this case, the overall focal point of the entire lens system can be controlled without changing the overall focal length f of the microlens 42M, by adjusting the focal length f1 of the first lens surface R1. By suitably setting the focal length f1, the distance between the pixel aperture 46A and the second lens surface R2 can be made sufficiently large from the viewpoint of processing.

Next, divergent rays 60B (shown by the dashed lines in the figure), which are incident at an angle relative to the optical axis 60, will be considered. When light whose divergence angle is ±β relative to the optical axis 60 illuminates the liquid crystal panel 25, it passes through the first lens surface R1 in such a state that the divergence angle relative to the principal ray 60A remains ±β. Then, since the focal point of the second lens surface R2 is at approximately the same position as the principal point H1 of the first lens surface R1, the light becomes parallel to the principal ray 60A when it passes through the second lens surface R2. More specifically, both the principal ray 60A and the divergent rays 60B have the same maximum emission divergence angle a when they are emitted from the microlens 42M.

When the microlens 42M has the above-described optical function, the maximum emission divergence angle θ of the light emitted from the liquid crystal panel 25 is expressed as follows:

$$\theta = \alpha \tag{8}$$

Figure 13:
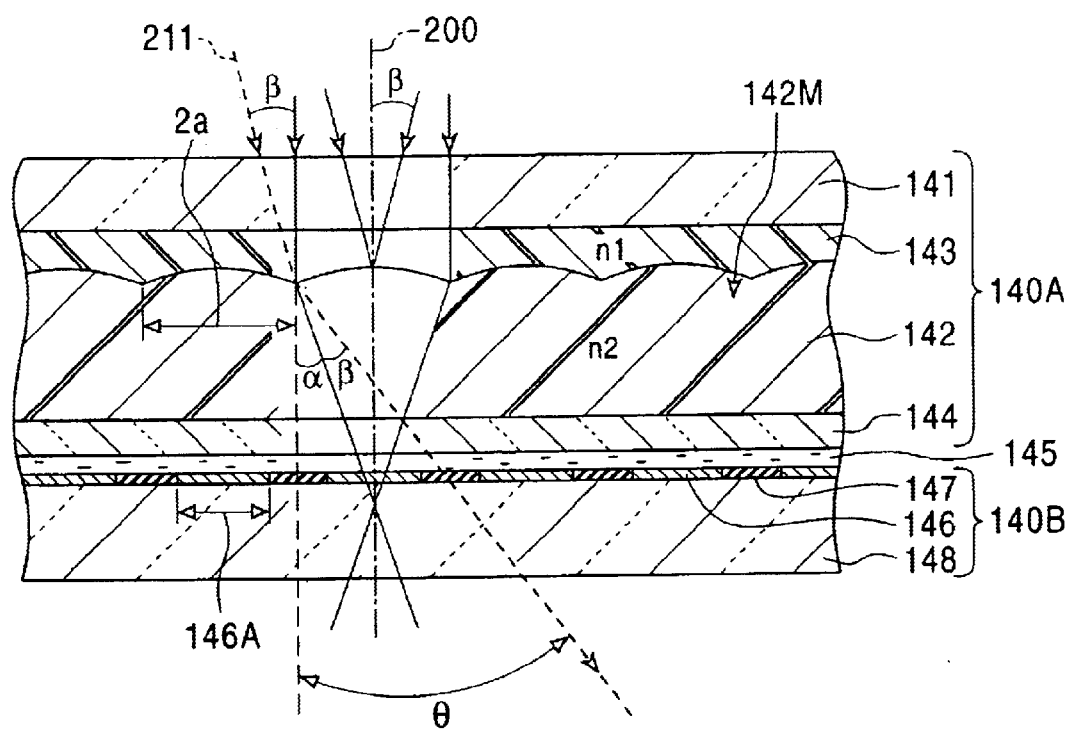
FIG. 13 is a sectional view showing an example of the construction of a liquid crystal panel of the known art.
Figure 14:
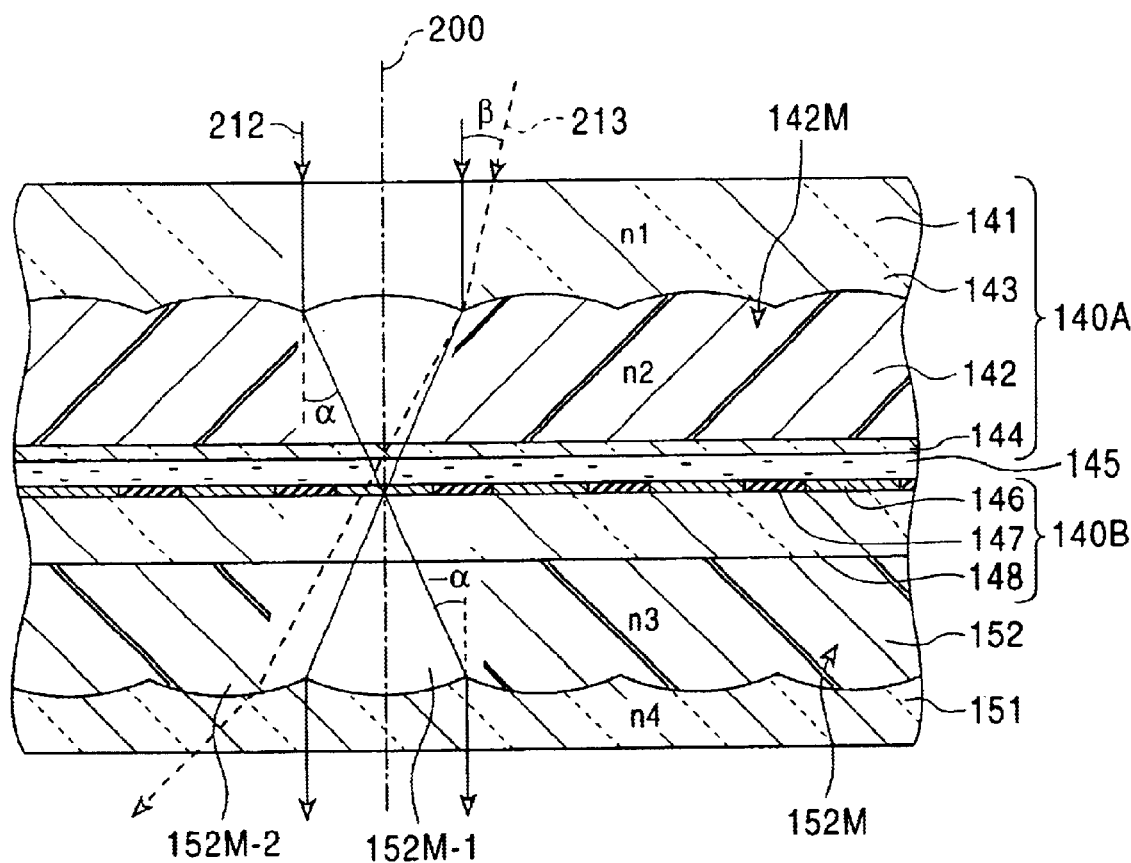
FIG. 14 is a sectional view sowing another example of the construction of a liquid crystal panel of the known art.

Equation (8) shows that the emission divergence angle θ of the liquid crystal panel 25 is also determined only on the basis of the external size (radius) a of the microlens 42M and the focal length f2 of the second lens surface R2, and the incident divergence angle β does not effect the emission divergence angle θ. More specifically, according to the present embodiment, the incident divergence angle β of the illuminating light is eliminated when the light is emitted from the liquid crystal panel 25, so that the emission divergence angle θ can be reduced by β compared with the example of the known art shown in FIG. 13. Therefore, according to the present embodiment, even when the overall focal length of the microlens 42M is reduced, the shading at the black matrix elements 47 can be reduced compared with the example of the known art shown in FIG. 13. Accordingly, the focal length of the microlens 42M can be greatly reduced without reducing the effective aperture ratio, and the spot size of light condensed on the pixel aperture 46A can also be greatly reduced. As a result, the effective aperture ratio of the liquid crystal panel 25 can be increased.

Furthermore, according to the present embodiment, the spot size of the condensed light relative to the size of the pixel aperture 46A can be greatly reduced compared with the known art. Therefore, the incident divergence angle β can be increased compared with the known art. In addition, as is apparent from FIG. 4, when the incident divergence angle is increased, the spot size of the condensed light can be increased to the limit, that is, the size of the pixel aperture 46A, so that the amount of emitted light can be increased. When the incident divergence angle β is increased, the amount of light incident on the liquid crystal panel 25 and the size of a housing for installing the optical system are greatly affected.

Figure 12:
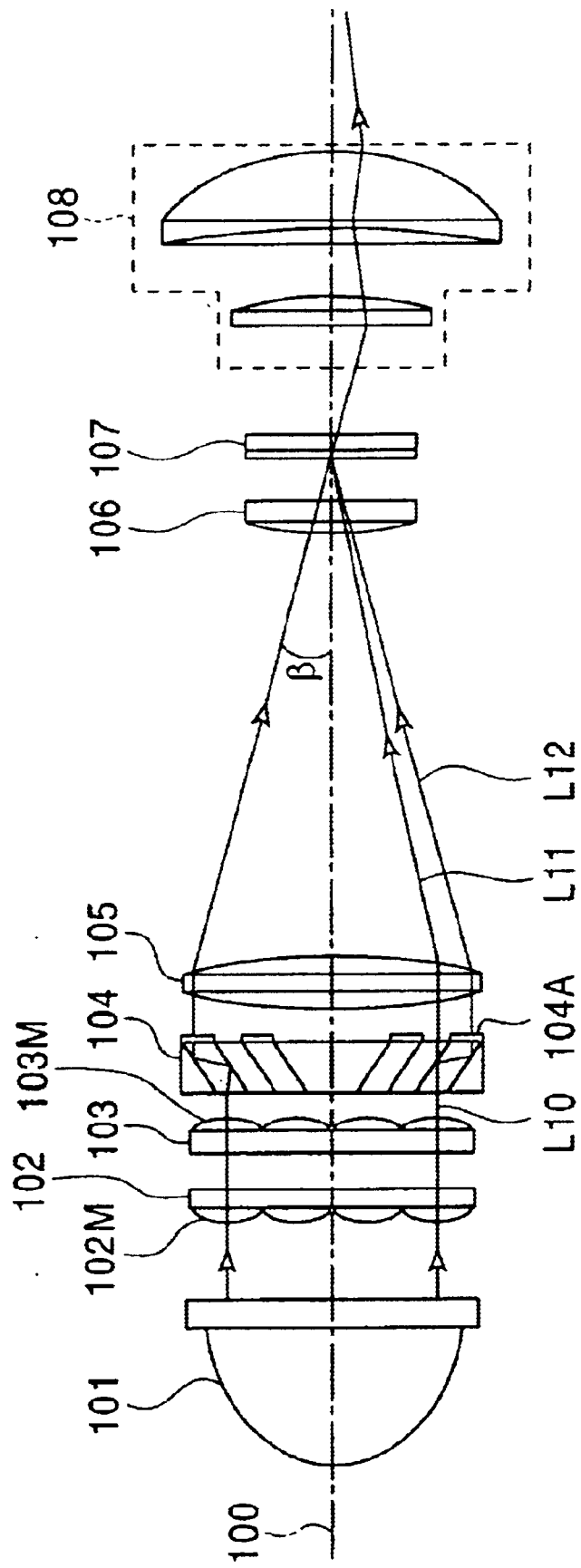
FIG. 12 is a schematic plan view showing the construction of an optical system of a projection liquid crystal display apparatus of the known art.

As described above with reference to FIG. 12, when fc and rc are the focal length and the radius, respectively, of the condenser lens 16, the divergence angle β of the illuminating light incident on the liquid crystal panel 25, is defined as follows:

$$\tan \beta = rc/fc \tag{3}$$

Accordingly, the incident divergence angle β is determined on the basis of the radius rc and the focal length fc of the condenser lens 16. However, the radius rc of the condenser lens 16 is substantially determined by the size of the lamp forming the light source 11, so that when the incident divergence angle β is increased, the focal length fc is reduced. On the other hand, the magnification ratio M of the microlenses 12M formed on the first MLA 12 (a constant value defined as the ratio of the illuminating area of the liquid crystal panel 25 to the area of the first MLA 12) is determined as the ratio of the focal length fc of the condenser lens 16 to the focal length $f_{MLA2}$ of the microlenses 13M formed on the second MLA 13 as follows:

$$M = fc/f_{MLA2} \tag{7}$$

The divided light beams formed by the MLAs 12 and 13 are enlarged at the magnification ratio M and illuminate the liquid crystal panel 25.

Accordingly, when the focal length fc of the condenser lens 16 is reduced in order to increase the divergence angle β, the focal length $f_{MLA2}$ of the microlenses 13M formed on the second MLA 13 must also be reduced. When the focal length $f_{MLA2}$ is reduced, the distance between the MLA 12 and the MLA 13 is also reduced, so that the overall size of the optical system can be reduced. Accordingly, the size of the housing of the optical system can also be reduced.

As shown in FIG. 5, when D is the effective diameter of a single microlens in the second MLA 13, only the light beams which are incident on the area whose size is D/2 can be subjected to the polarization-conversion process of the PS composite element 15 due to the construction of the PS composite element 15. Accordingly, in order to improve the light-receiving efficiency of the PS composite element 15, the size of the light-source images on the second MLA 13 and the diameter of the light beams incident on the PS composite element 15 are preferably reduced. The size of the light-source images on the second MLA 13 is generally expressed by the arc length of the lamp forming the light source 11 and the distance between the reflection mirror and the arc of in light source 11 (arc-reflection mirror distance) as follows:

$$\text{Lamp Arc Length} \times f_{MLA2}/\text{Ark-Reflection Mirror Distance} \tag{8}$$

Accordingly, it is understood that when the incident divergence angle β is increased and the focal length $f_{MLA2}$ is reduced, the size of the light-source images on the second MLA 13 is also reduced. Therefore, the light-receiving efficiencies of the second MLA 13 and the PS composite element 15 are improved and the optical output of the overall illumination system positioned before the liquid crystal panel 25 is increased. Accordingly, the amount of light incident on the liquid crystal panel 25 can be increased.

As described above, by increasing the divergence angle β of light incident on the liquid crystal panel 25, the size of the housing of the optical system can be reduced and the optical output of the overall illuminating system can be increased at the same time.

Next, the positional relationship between the overall focal point of the microlens and the pixel aperture will be described below. In the present invention, the above-described positional relationship is adjusted and the focusing of light at the pixel aperture is controlled, so that a high effective aperture ratio can be obtained even when the aperture ratio is reduced as a result of size-reduction and the increase in precision of the liquid crystal panel. An experiment was performed by using a microlens having parameters shown in FIG. 6. The results will be explained below. The overall focal length of the microlens and the position of the pixel aperture were changed and the effective aperture ratio was determined. As shown in FIG. 6, in the microlens used for the experiment, the focal length of the first lens was 59.3 µm, the focal length of the second lens was 41.4 µm, the distance between the lenses was 41.4 µm, the overall focal length was 41.4 µm, the geometrical aperture ratio was 31%, the F-number of the projection lens was 1.7, and the dot pitch (pitch between the pixels) was 18 µm×18 µm.

Figure 7A:
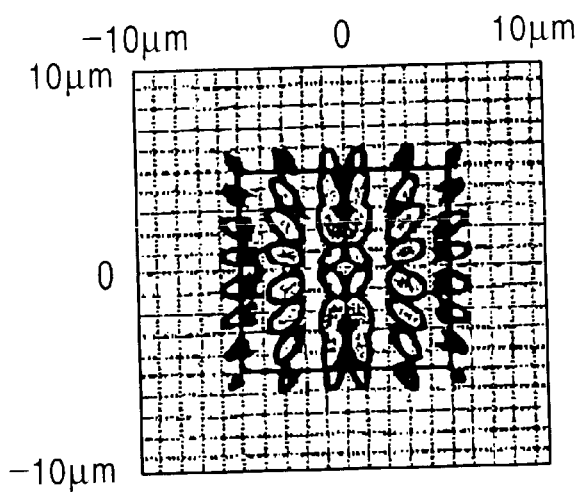
FIGS. 7A to 7C are diagrams showing light-source images observed via a pixel aperture.
Figure 7B:
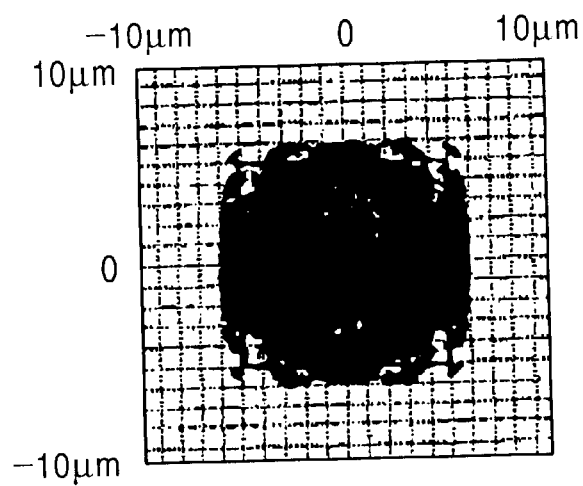
Figure 7C:
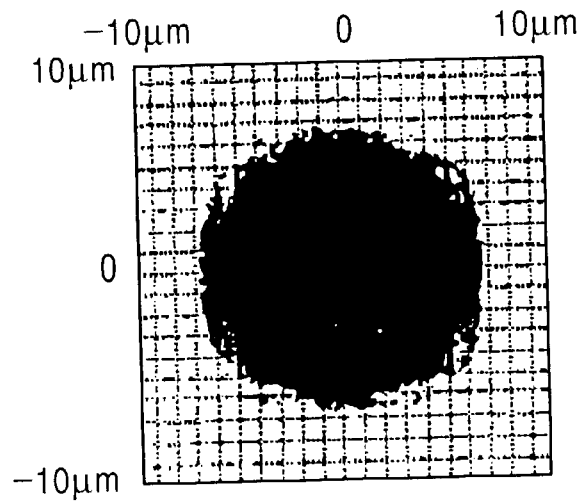

FIGS. 7A to 7C show the results of the experiment. FIG. 7A shows the light-intensity distribution at the aperture in a case in which the microlens having the parameters shown in FIG. 6 was used and the overall focal point thereof was at the same position as the pixel aperture. In this case, the effective aperture ratio was 80%. FIG. 7B shows the light-intensity distribution at the aperture in a case in which the microlens having the parameters shown in FIG. 6 was used and the overall focal point thereof was placed at a position shifted 6 µm from the pixel aperture toward the light source. All of the dimensions shown in FIG. 6 and the dimensions listed below are the dimensions in air. The amount of shift can also be expressed as a percentage: 6 µm/41 µm×100= 15%. In this case, the effective aperture ratio was 85%. FIG. 7C shows the result of a case in which the amount of shift is increased to 10 µm toward the light source. In this case, the effective aperture ratio was 75%. The effective aperture ratio shows the ratio of the light beams passing through the microlens and the pixel aperture and incident on the projection lens to the light beams emitted from the light source and incident on the pixel. The light source images on the second array are clearly shown at the focal point, as shown in FIG. 7A, but are blurred at the position 6 µm away from the focal point, as shown in FIG. 7B. However, the spot sizes are almost the same. It is to be noted that when the overall focal point is shifted from the pixel aperture by 6 µm, the effective light beams that passed through the pixel aperture and the projection lens are increased by about 5%. This means that when the pixel aperture is on the focal plane, a considerable number of effective light beams, which are able to pass through the projection lens, are included in the light beams blocked at the aperture. In addition, it means that when the pixel aperture is shifted from the focal plane by 6 µm, the effective light beams are collected in the central area. In addition, as shown in FIG. 7C, when the pixel aperture is shifted from the focal plane by 10 µm, the number of effective light beams which pass through the projection lens is reduced compared with the case in which the pixel aperture is shifted by 6 µm since the spot size is increased. In this case, the percentage of the amount of shift relative to the overall focal length is 24%. Accordingly, it is discovered that the effective aperture ratio can be increased by shifting the pixel aperture from the focal plane by more than 10% of the overall focal length. However, there is no advantage in shifting the pixel aperture from the focal plane by a large amount if the effective aperture ratio is reduced, as shown in FIG. 7C. The direction to shift the pixel aperture may be either the negative direction in which the pixel aperture moves toward the light source or the positive direction in which the pixel aperture moves away from the light source, and the amount of shift is preferably ±10% or more of the overall focal length. The above-described results mean that the optimal point with regard to the spot diameter, the distribution of the effective light beams, and the effective aperture ratio is shifted from the overall focal point in accordance with the emission intensity distribution of the light source used. When the amount of shift is optimized, the brightness of the projection liquid crystal display apparatus can be increased. In addition, the incident divergence angle β can be further increased, so that the light-utilizing efficiency of the illuminating system can be improved. Accordingly, the optical output can be increased and the overall size can be reduced.

Figure 8:
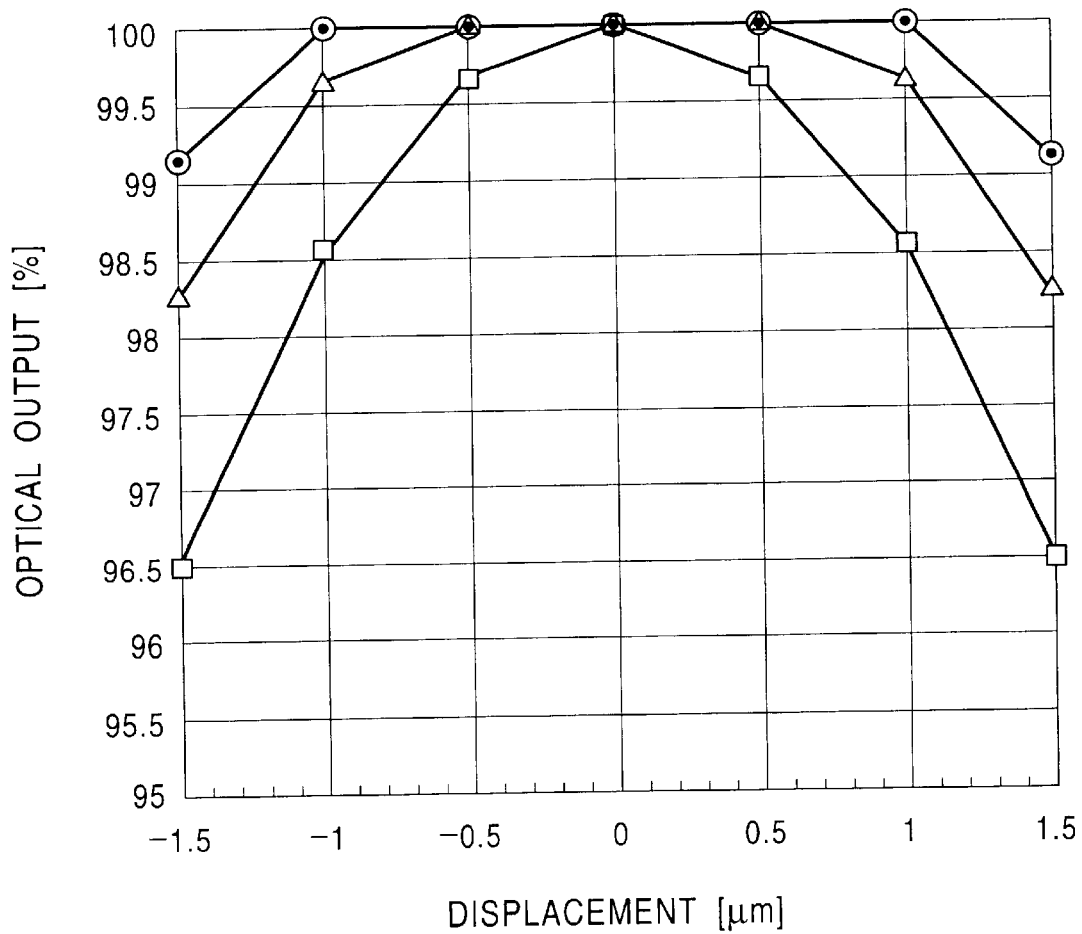
FIG. 8 is a graph showing the relationship between the displacement between the microlens array and a substrate in which pixel apertures are formed and the optical output.

FIG. 8 is a graph showing the relationship between the displacement between the microlens array and the substrate in which the pixel apertures are formed and the optical output. In the graph, the curve connecting the circles represents a case in which the construction shown in FIG. 2 is applied, wherein the overall focal point of each microlens is shifted from the corresponding pixel apertures by 6 µm. The curve connecting the triangles represents the comparative example shown in FIG. 3, wherein the overall focal point of each microlens is at the same position as the corresponding pixel aperture. The curve connecting the rectangles represents an example in which the microlens has a single-lens construction instead of the above-described double-lens construction in which a condenser lens and a field lens are combined. As is apparent from the graph, the optical output is reduced as the displacement increases. More specifically, as the displacement increases, the amount of illuminating light which is blocked at the pixel apertures is increased. However, when the double-lens construction is applied and the overall focal point is shifted from the pixel aperture, the optical output is reduced only by a small amount even when the displacement is increased. For example, the optical output is almost constant when the displacement is in the range of ±1 µm. The present invention is especially effective when the microlenses are used for a panel which is large relative to the spot diameter at the aperture. According to the present invention, reduction in the optical output caused by the displacement between the microlens array and the substrate in which the pixel apertures are formed can be prevented and variations in quality between devices can be reduced.

Figure 9A:
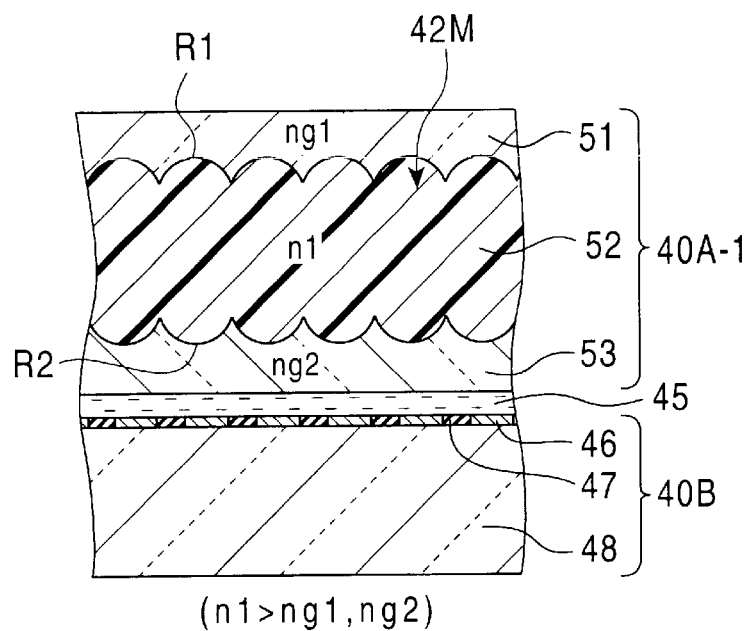
FIGS. 9A and 9B are sectional views showing modifications of the liquid crystal panel shown in FIG. 2.
Figure 9B:
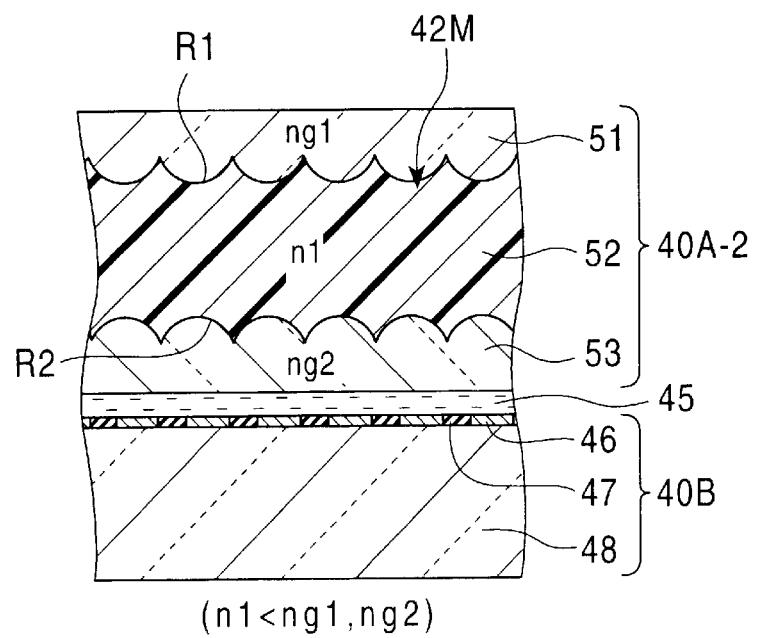

FIGS. 9A and 9B are diagrams showing modifications of the liquid crystal panel 25. In the constructions shown in FIGS. 9A and 9B, opposing substrates 40A-1 and 40A-2 are different from the opposing substrate 40A shown in FIG. 2. Although the lens surfaces R1 and R2 of the microlenses 42M are formed at the boundaries between resin and resin in FIG. 2, they may also be formed at boundaries between glass and resin (or air layer). In FIGS. 9A and 9B, the microlenses 42M are formed by disposing a resin layer 52, whose refractive index is n1, between glass layers 51 and 53, whose refractive indexes are ng1 and ng2, respectively. The first lens surfaces R1 are formed at the boundary between the glass layer 51 and the resin layer 52, and the second lens surfaces R2 are formed at the boundary between the glass layer 53 and the resin layer 52. The shapes of the lens surfaces R1 and R2 are determined by the difference in refractive indexes at the two boundaries.

FIG. 9A shows a construction in which n1, ng1, and ng2, that is, the refractive indexes of the resin layer 52, the glass layer 51, and the glass layer 53, respectively, satisfy n1>ng1 and n1>ng2. In such a case, the first lens surfaces R1 are convex toward the light-incident side (toward the light source), and the second lens surfaces R2 are convex toward the light-emission side. FIG. 9B shows a construction in which the refractive indexes of the resin layer 52, the glass layer 51, and the glass layer 53 satisfy n1<ng1 and n1<ng2. In such a case, the first lens surfaces R1 are concave toward the light-incident side and the second lens surfaces R2 are concave toward the light-emission side. In the construction shown in FIG. 9B, the resin layer 52 may also be an air layer.

An example of a method for manufacturing the opposing substrates 40A-1 and 40A-2 of the liquid crystal panels shown in FIGS. 9A and 9B will be described below. First, the patterns of the lens surfaces R1 and R2 are formed on the surfaces of two glass substrates, and the two glass substrates are disposed such that they oppose each other. Then, an optical resin (for example, urethane resin, acrylic resin, etc.) for forming the resin layer 52 is injected between the glass substrates. The surfaces of the glass substrates can be processed by using, for example, various etching methods (isotropic etching, anisotropic etching, dry etching, etc.)

In the constructions shown in FIGS. 9A and 9B, the resin layers 43A and 43B shown in FIG. 2 are omitted from the opposing substrates. Thus, the number of resin layers and the costs can be reduced compared with the construction shown in FIG. 2.

Figure 10A:
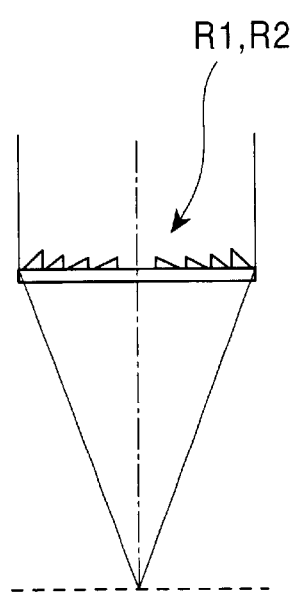
FIGS. 10A to 10C are diagrams showing modifications of the shape of the surface of the microlens.
Figure 10B:
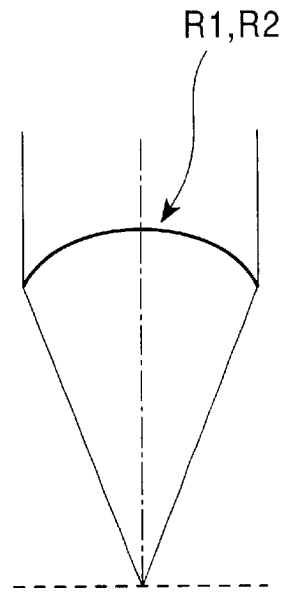
Figure 10C:
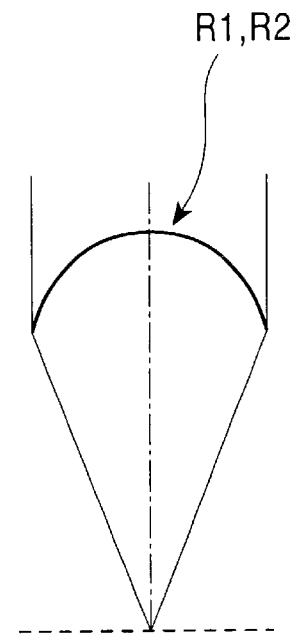

FIGS. 10A and 10B are diagrams showing the modifications regarding the shape of the lens surfaces R1 and R2 of the microlens 42M. In addition to the spherical surface shown in FIG. 10C, the lens surfaces R1 and R2 may also be formed in an aspherical surface such as an ellipsoidal surface (FIG. 10B), a Fresnel surface (FIG. 10A), etc. Although the spherical lens is advantageous in that the surface thereof can be easily processed, since the radius of curvature corresponding to the minimum focal length is limited by the dot size, it is difficult to reduce the focal length if the difference between the refractive indexes of the lens surfaces is not sufficient. As is understood from the figures, lenses having the aspherical surface and the Fresnel surface are advantageous for reducing the focal length and ensuring the flatness of the principal surface of the lens. Accordingly, the incident divergence angle β can be reliably canceled.

Figure 11:
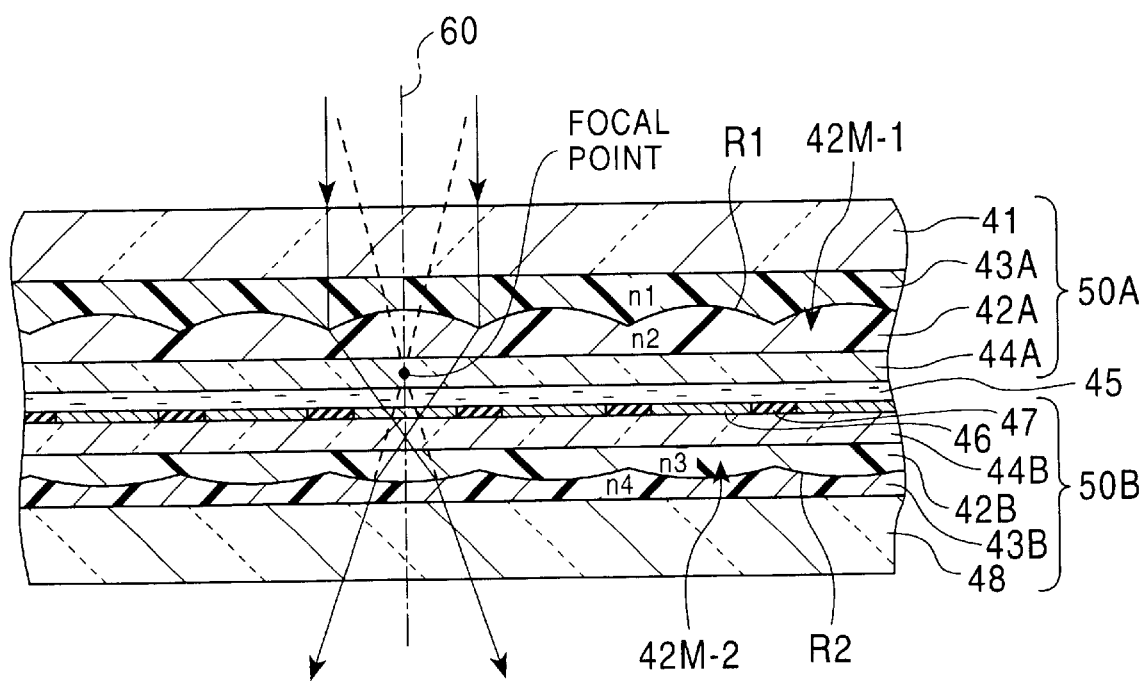
FIG. 11 is a sectional view showing another modification of the liquid crystal panel shown in FIG. 2.

FIG. 11 is a diagram showing another modification of the liquid crystal panel 25. In FIG. 11, the lens surface serving as a condenser lens is formed in an opposing substrate and the lens surface serving as a field lens is formed in a pixel electrode substrate. The liquid crystal panel according to this modification includes a pixel electrode substrate 50B and an opposing substrate 50A which is disposed at the light incident side of the pixel electrode substrate 50B in such a manner that the opposing substrate 50A and the pixel electrode substrate 50B oppose each other with a liquid crystal layer 45 therebetween.

The opposing substrate 50A includes a glass substrate 41, a resin layer 43A, a first microlens array 42A, and a cover glass 44 in that order from the light-incident side. The pixel electrode substrate 50B includes pixel electrodes 46 and black matrix elements 47, a cover glass 44B, a second microlens array 42B, a resin layer 43B, and a glass substrate 48 in that order from the light-incident side.

The first microlens array 42A is formed of an optical resin and includes a plurality of first microlenses 42M-1 arranged two-dimensionally in correspondence with the pixel electrodes 46. Each microlens 42M-1 includes a first lens surface R1 having positive refractive power and serves as a condenser lens. In the modification shown in FIG. 11, when n1 and n2 are refractive indexes of the resin layer 43A and the first microlens array 42A, respectively, n2>n1 is satisfied. In addition, the first lens surfaces R1 are convex toward the light-incident side (toward the light source).

Similarly to the first microlens array 42A, the second microlens array 42B is formed of an optical resin and includes a plurality of second microlenses 42M-2 arranged two-dimensionally in correspondence with the pixel electrodes 46. Each microlens 42M-2 includes a second lens surface R2 having positive refractive power and serves as a field lens. Accordingly, the focal point of the second lens surface R2 is at approximately the same position as the principal point of the first lens surface R1 (the first microlens 42M-1). In the modification shown in FIG. 11, when n3 and n4 are refractive indexes of the second microlens array 42B and the resin layer 43B, respectively, n3>n4 is satisfied. In addition, the second lens surfaces R2 are convex toward the light-emission side.

The modification shown in FIG. 11 is different from the construction shown in FIG. 2, in that each pixel aperture 46A is placed between the microlenses 42M-1 and 42M-2 (that is, between the two lens surfaces R1 and R2). However, similarly to the construction shown in FIG. 2, the overall focal point of the two microlenses 42M-1 and 42M-2 is shifted from the pixel aperture 46A. The positional relationship between the overall focal point and the pixel aperture 46A can be controlled by, for example, adjusting the distance between the microlenses 42M-1 and the pixel apertures 46A and the distance the microlenses 42M-2 and the pixel apertures 46A. It is considered that the effective aperture ratio is improved the most in this modification, although the processing is most difficult.

In the modification shown in FIG. 11, since the efficiency relative to the aperture is determined by the first lens, which is at a position closer to the light source, the focal length of the first lens is reduced in a range such that the it can be received by the second lens. In addition, the aperture is disposed at the beam waist, which is at a position closer to the light source than the focal point of the first lens, so that the effective aperture ratio can be improved. In this case, the aperture may be disposed at a position shifted from the overall focal point of the microlens toward the light-emission side.

The present invention is not limited to the above-described embodiment, and various modifications are possible. For example, although only two lens surfaces having power are provided for each dot in the above-described embodiment, three or more lens surfaces having power may also be provided for each dot. In addition, the present invention is not limited to tree-panel projection liquid crystal display apparatuses, and may also be applied to single-panel projection liquid crystal display apparatuses.

What is claimed is:

1. A liquid crystal display device comprising:

a liquid crystal layer;

a plurality of pixel electrodes, having pixel apertures which allow light to pass therethrough; and at least one microlens array disposed at at least one of a light-incident side and a light-emission side of the liquid crystal layer, the microlens array having a plurality of microlenses arranged two-dimensionally in correspondence with the pixel apertures, wherein each microlens includes a condenser lens and a field lens, the condenser lens having at least one lens surface along an optical axis and condensing light incident thereon toward the corresponding pixel aperture, and the field lens having at least one lens surface along the optical axis and being constructed such that the focal point of the field lens is at approximately the same position as the principal point of the condenser lens, and wherein the overall focal point of the condenser lens and the field lens is shifted from the corresponding pixel aperture and the amount of shift is set such that an effective aperture ratio is increased compared with the case in which the overall focal point is at the same position as the corresponding pixel aperture.

2. A liquid crystal display device according to claim 1, wherein the amount of shift exceeds ±10% of the overall focal length.

3. A liquid crystal display device according to claim 1, wherein, when light having a divergence angle component is incident, the divergence angle component is eliminated by the optical behavior of the field lens when the light is emitted from the microlens array, so that the emission angle of the incident light is the same as an emission angle of a principal ray which is incident parallel to the optical axis.

4. A liquid crystal display device according to claim 1, wherein the liquid crystal display device is used in a projection liquid crystal display apparatus in which light that has passed through the liquid crystal display device is projected by a projection lens, and wherein a numerical aperture of each microlens is set such that the numerical aperture approximately corresponds to an F-number of the projection lens.

5. A liquid crystal display device according to claim 1, wherein each microlens is formed of a surface including at least one of a spherical surface, an aspherical surface, and a Fresnel surface.

6. A projection liquid crystal display apparatus comprising:

a light source which emits light;

a liquid crystal display device which optically modulates incident light; and a projection lens which projects light modulated by the liquid crystal display device, wherein the liquid crystal display device includes a liquid crystal layer, a plurality of pixel electrodes, having pixel apertures which allow light to pass therethrough, and at least one microlens array disposed at at least one of a light-incident side and a light-emission side of the liquid crystal layer, the microlens array having a plurality of microlenses arranged two-dimensionally in correspondence with the pixel apertures, wherein each microlens includes a condenser lens and a field lens, the condenser lens having at least one lens surface along an optical axis and condensing light incident thereon toward the corresponding pixel aperture, and the field lens having at least one lens surface along the optical axis and being constructed such that the focal point of the field lens is at approximately the same position as the principal point of the condenser lens, and wherein the overall focal point of the condenser lens and the field lens is shifted from the corresponding pixel aperture and the amount of shift is set such that an effective aperture ratio is increased compared with the case in which the overall focal point is at the same position as the corresponding pixel aperture.

* * * * *